United States Patent [19]

Kato et al.

[11] Patent Number: 5,315,503
[45] Date of Patent: May 24, 1994

[54] NUMERICAL CONTROL APPARATUS HAVING A TEACHING FUNCTION AND A METHOD OF TEACHING A MACHINING PROGRAM THEREBY

[75] Inventors: Kenji Kato; Takeshi Momochi, both of Shizuoka, Japan

[73] Assignee: Toshiba Kikai Kabushiki Kaisha, Tokyo, Japan

[21] Appl. No.: 951,316

[22] Filed: Sep. 25, 1992

Related U.S. Application Data

[63] Continuation of Ser. No. 510,238, Apr. 18, 1990, abandoned.

[30] Foreign Application Priority Data

Apr. 18, 1989 [JP]  Japan .................................. 1-98177

[51] Int. Cl.⁵ ....................... G05B 19/42; G06F 15/46
[52] U.S. Cl. .................................. 364/192; 364/191; 364/474.22
[58] Field of Search ............... 364/190, 191, 192, 193, 364/474.22; 395/99; 318/568.13, 568.14

[56] References Cited

U.S. PATENT DOCUMENTS

| | | | |
|---|---|---|---|
| 3,878,983 | 4/1975 | Hamill, III et al. | 364/192 |
| 3,920,972 | 11/1975 | Corwin, Jr. et al. | 364/190 |
| 4,086,522 | 4/1978 | Engelberger et al. | 364/193 |
| 4,140,953 | 2/1979 | Dunne | 318/568.14 |
| 4,314,330 | 2/1982 | Slawson | 364/192 |
| 4,379,335 | 4/1983 | Kirsch et al. | 364/192 |
| 4,385,358 | 5/1983 | Ito et al. | 364/577 |
| 4,566,061 | 1/1986 | Ogden et al. | 364/191 |
| 4,570,385 | 2/1986 | Richter et al. | 364/193 |
| 4,633,385 | 12/1986 | Murata et al. | 364/191 |
| 4,706,002 | 11/1987 | Fukuyama | 364/192 |
| 4,737,697 | 4/1988 | Maruo et al. | 318/568.14 |
| 4,757,459 | 7/1988 | Lauchnot et al. | 318/568.14 |
| 4,764,883 | 8/1988 | Nakagawa et al. | 364/191 |
| 4,924,403 | 5/1990 | Kawamura et al. | 364/192 |
| 5,057,995 | 10/1991 | Mizuno et al. | 364/192 |

*Primary Examiner*—Jerry Smith
*Assistant Examiner*—Paul Gordon
*Attorney, Agent, or Firm*—Cushman, Darby & Cushman

[57] ABSTRACT

The present invention provides an NC system (apparatus and method) for updating a machining program having more than one teaching mode. The present invention enables a machine operator to selectively replace blocks of the preexisting machining program with machine code data produced in one of the teaching modes during use of the machine. The teaching modes are changeable between an automatic teaching mode, a manual mode and an a manual data input (MDI) teaching mode. After the operation of the machine in one of the teaching modes is complete, the machining program is updated and stored. Thus, the machining program can be updated with minimal effort by the operator.

17 Claims, 8 Drawing Sheets

FIG. 4A

JOY-STICK TEACHING MODE

| ITEM | OUTPUT DATA |
|---|---|
| Beginning | Special code, coordinate |
| Ending<br>Mode change | Special code |
| Running | Coordinate value per sampling time |
| Spindle rotation | (not used) |
| Spindle stop | (not used) |
| Change of override | (not used) |
| Mist coolant<br>Tool unclamp<br>Tool orientation<br>Table index | (not used) |
| Change of rapid feed<br>Change of cutting feed | (not used) |

FIG. 4B

PROGRAM CODE

MPG TEACHING MODE

| ITEM | OUTPUT DATA |
|---|---|
| Beginning | (not used) |
| Ending Mode change | M code and coordinate value in working None at stop |
| Running | Coordinate value when moving direction is changed |
| Spindle rotation | M code and spindle speed after output of coordinate value |
| Spindle stop | M code after output of coordinate value |
| Change of spindle override | Output of spindle speed code after output coordinate value |
| Mist coolant Tool unclamp Tool orientation Table index | Output of auxiliary function code after output of coordinate value |
| Change of rapid feed Change of cutting feed | (not used) |

FIG. 5B

PROGRAM MODE

LEVER SWITCH TEACHING MODE

| ITEM | OUTPUT |
|---|---|
| Beginning | (not used) |
| Ending<br>Mode change | M code coordinate value in working<br>None at stop |
| Running | Falling signal of lever switch<br>Changing signal of lever switch if axis is moving |
| Spindle rotation | M code and spindle speed after output of coordinate value |
| Spindle stop | M code after output of coordinate value |
| Change of spindle override | Spindle speed code after output of coordinate value |
| Mist coolant<br>Tool unclamp<br>Tool orientation<br>Table index | Output of auxiliary code after output of coordinate value |
| Change of rapid feed<br>Change of cutting feed | Positioning data or linear interpolation command data after detecting status of lever switches |

NUMERICAL CONTROL APPARATUS HAVING A TEACHING FUNCTION AND A METHOD OF TEACHING A MACHINING PROGRAM THEREBY

This is a continuation of application Ser. No. 07/510,238, filed on Apr. 18, 1990, which was abandoned upon the filing hereof.

BACKGROUND OF THE INVENTION

1. Field of the Invention

This invention generally relates to a numerical control apparatus, and more specifically to an apparatus having a teaching function and a method of teaching a machining program.

2. Description of the Related Art

Machining programs are specially designed for use in a numerical control (NC) apparatus. Machining programs are also known as "NC programs", and are composed of blocks of NC programming codes. These machining programs are input to an NC apparatus through input devices such as a paper tape reader or a flexible disk drive unit, and are used in the machining process of a workpiece.

The preparation of such machining programs is difficult because a special knowledge is needed of the materials of the workpiece, the conditions of the machining process, and the programming codes of various machine tools and the like.

The codes of the normal machining program generally are not defined if a workpiece has a free curved surface, because such codes typically define linear interpolation and circular interpolation. In such a case an NC apparatus having a teaching function is used. This type of NC apparatus is generally controlled by a machine tool operator in a factory.

The operator produces a machining program during manual operation mode of the NC apparatus by using a teaching mode within the NC apparatus. The resulting machining program is then used for machining of the next workpieces in a play back mode.

However, when using such an NC apparatus, the operator must operate the machine to produce all blocks of the machining program, resulting in an increase in the operator's work load. This increase may be significant since much more time is needed to produce such a machining program.

If an NC apparatus which does not have a teaching function is used, the operator must wait for the machining program to be changed by a programmer if any changes are required, so that response time becomes much longer. The programmer, in general, does not have information regarding machining conditions or the know-how which is required for machining at the machining spot, such as, for example, which tools are used in the machining process, the material of the workpiece, and the true shape of the workpiece.

Further, if a workpiece has a free curved surface, the programmer does not prepare the program to define the code of the machining program and the machining conditions described above in order to produce that surface. Thus the operator must operate in a manual mode or a manual data input mode (MDI mode) and set such machining conditions into the machine. When the workpiece is machined, the operator must operate in the manual operation mode or manual data input mode to produce such free curved surfaces. It is notably difficult to produce a free curved surface using manual operation and manual data input mode. As a result, if there exists a number of workpieces, the operator must repeat this difficult operation for each workpiece.

Since a typical NC apparatus having a teaching mode provides the teaching function only in the manual mode, there is no relationship between the normal automatic mode, the manual data input mode, or the manual mode.

SUMMARY OF THE INVENTION

In view of the circumstances mentioned above, an NC apparatus is needed which has a teaching function that has some relationship between a normal automatic mode and the manual mode or the manual data input mode, so that the machining conditions and know-how by the operator can be added to a machining program prepared by the programmers. If such an apparatus is provided, a machining program may be rapidly produced with a CAD system or another system, whereby the operator has the ability to rapidly change the machining program as needed. Furthermore, the operator can then use the improved machining program for the machining process.

It is an object of the present invention to provide an NC apparatus having a teaching function which enables an operator at the machining spot to efficiently add machining conditions and know-how to the machining program prepared by the programmers.

It is an additional object of the present invention to provide an NC apparatus having a teaching function with interchangeable submodes for updating the machining program.

It is still a further object of the present invention to provide an NC apparatus having a teaching function which enables the operator at the machining spot to selectively replace blocks of the preexisting machining program with machine code data generated by one of the interchangeable submodes of the teaching function.

In carrying out these and other objectives, the present invention provides an NC apparatus having a teaching function, the apparatus comprising: input-output means for inputting a input machining program and displaying the input machining program; program calculation means for calculating and generating a teaching machine program; combination means for combining the input machining program and the teaching machine program and producing a resulting machining program; and memory means for storing the input machining program, the teaching machining program and the resulting machining program.

The present invention also provides a method of teaching a predetermined machining program for an apparatus comprising the steps of: selecting an operating mode and operating the apparatus according to the predetermined program; interrupting the operation of the apparatus according to the predetermined program; operating the apparatus according to a newly generated program; combining the newly generated program with the predetermined program; and storing the resulting combined program.

Other objects, features and advantages of the invention will appear more fully from the following description.

BRIEF DESCRIPTION OF THE DRAWINGS

The present invention is best understood with reference to the accompanying drawings in which:

FIGS. 4A and 4B illustrate a machining program output from the teaching data production unit during operation with a joystick in the manual teaching operation.

FIGS. 5A and 5B illustrate a machining program output from the teaching data production unit during operation with a manual pulse generator in the manual teaching operation.

FIGS. 6A and 6B illustrate a machining program output from the teaching data production unit during operation with a manual feed lever in the manual teaching operation.

DETAILED DESCRIPTION OF THE PREFERRED EMBODIMENT

The preferred embodiment of the present invention will now be described in more detail with reference to the accompanying drawings.

Figure 1:
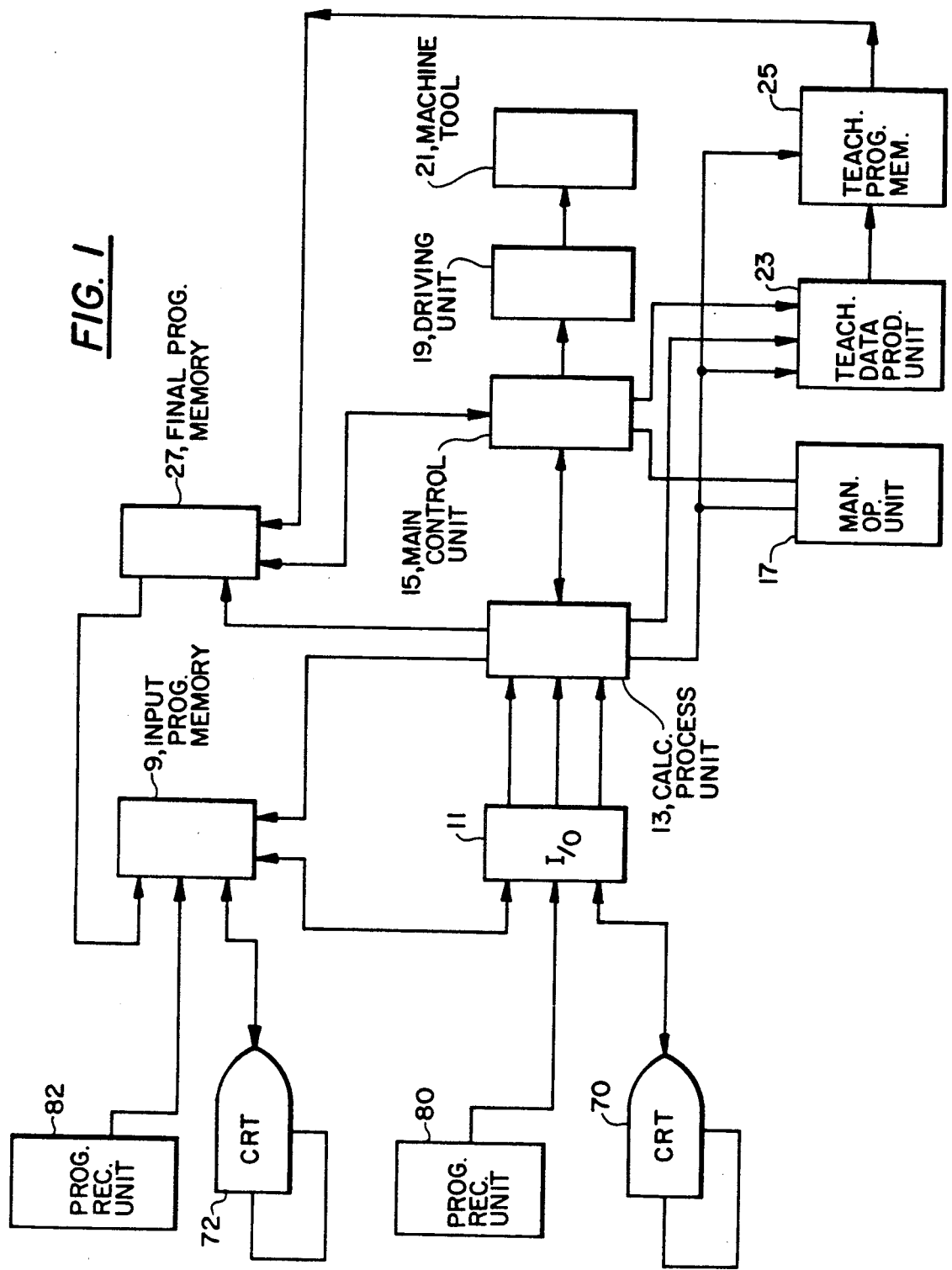
FIG. 1 is a block diagram of an NC apparatus according to an embodiment of the invention.

FIG. 1 shows control block diagram of a numerical control (NC) apparatus according to an embodiment of the present invention. The NC apparatus comprises an input-output control unit 11, a calculation process unit 13, a main control unit 15, a drive unit 19, a manual operation unit 17, a teaching data production unit 23, a teaching program memory 25, a final program memory 27, and an input program memory 9.

In addition to these components, the machining program recording units 80, 82 and the data setting display units 70, 72 are also included in the NC apparatus.

FIG. 1 also shows a machine tool 21 which is controlled by the NC apparatus of the present invention.

As shown in FIG. 1, machining programs are input from the machining program recording unit 80, such as a paper tape reader or a flexible disk drive unit, and sent to the input output control unit 11. A machining program may be input also during a manual data input mode (MDI) via a keyboard on the data setting display unit 70, whereby the input machining program is displayed on a CRT display therein.

The machining program produced with the keyboard is edited on the CRT display of the data setting display unit 70, and is stored in the input program memory 9 through the input output control unit 11.

The auxiliary data setting display unit 72 also has a CRT display and a keyboard, and is used as a remote data setting and display device for a larger machine tool. The machining program recording unit 82 also has a tape reader and a flexible disk drive unit and is also used to input machining programs which are stored in a tape or in a flexible disk.

The input output control unit 11 inputs and reads machining programs from the paper tape reader of the machining program recording unit 80. The data of the MDI mode from the data setting display unit 70 is also input and read, and is finally output to the input program memory 9 and to the calculation process unit 13.

The calculation process unit 13 includes microprocessors and analyzes the data based on the machining program from the machining program recording unit 80 or the data setting display unit 70. The calculation process unit 13 also analyzes the mode of operation, and sends the code data (machining program command codes) to the main control unit 15.

The calculation process unit 13 also calculates and generates new machining program codes such as cutter path code, feed speed code and other code data for the machine tool drive according to the mode of operation in the mode of teaching.

The main control unit 15 comprises microprocessors and controls all the data flow of the NC apparatus. Further, based on the machining program command code which is sent from the calculation process unit 13, the main control unit 15 generates and outputs control command data to the driving unit 19. The driving unit 19 drives the machine tool 21 with the control command data which is output from the main control unit 15.

The manual operation unit 17 produces manual data for the manual mode when the operator operates the machine tool in the manual mode of operation in both the TEACHING MODE and the NORMAL MODE.

The operation data input from the manual operation unit 17 and the data input from the main control unit 15 are sent to the teaching data production unit 23. The teaching data production unit 23 generates the NC command data for the NC code, and sends the NC command data to the teaching program memory 25 in the TEACHING MODE.

The final program memory 27 is used as a memory in which the input machining program is integrated with a machining program taught and used during a real machining process. Thus, a final machining program which includes a machining program taught and used during a real machining process by the operator is stored in the final program memory 27.

Figure 2:
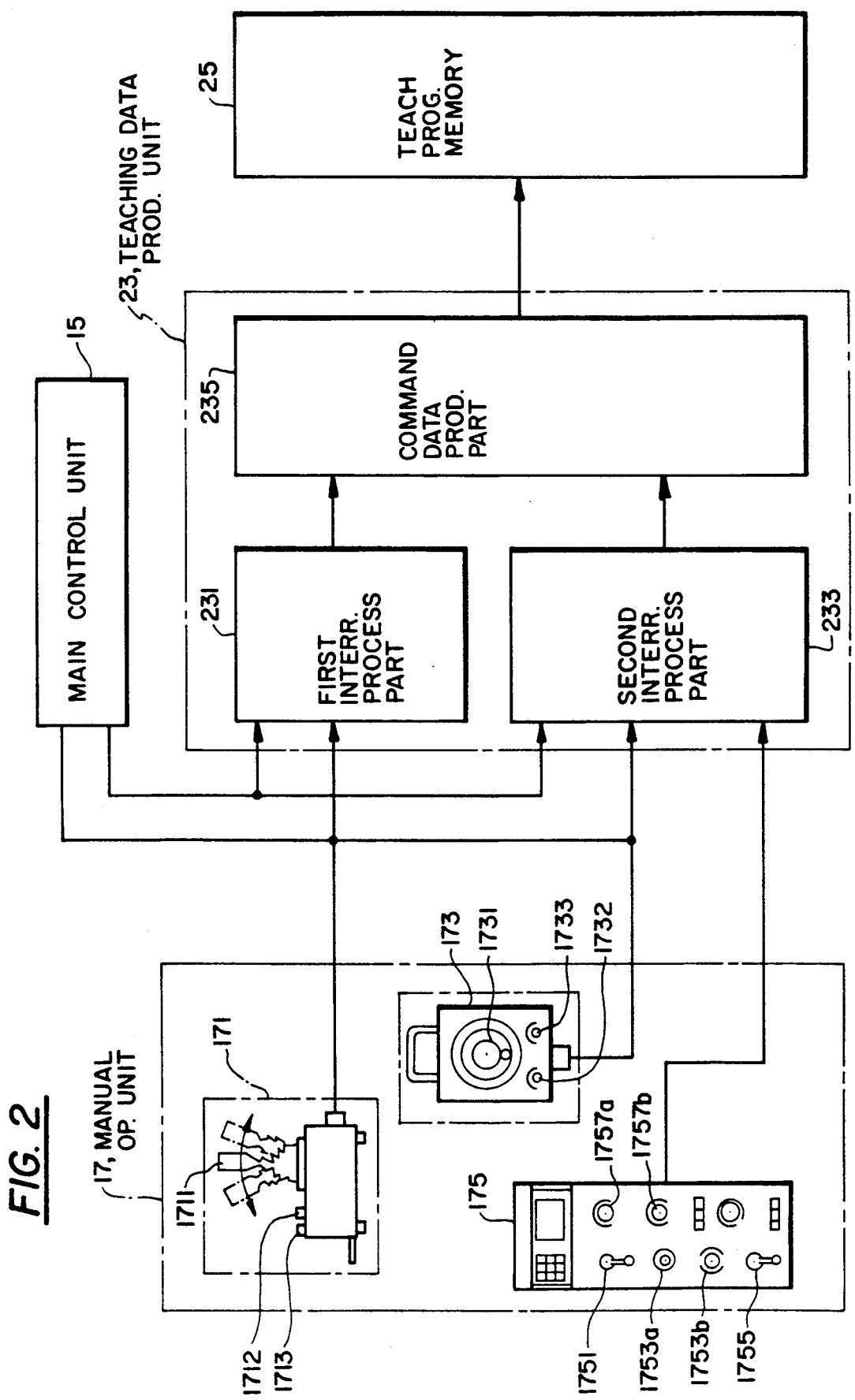
FIG. 2 is a detailed block diagram of the manual operation unit and the teaching data production unit in FIG. 1.

The manual operation unit 17 and the teaching data production unit 23 are shown in more detail in FIG. 2.

As shown in FIG. 2, the manual operation unit 17 includes a joystick part 171, a manual pulse generator (MPG) part 173 and a lever switch part 175.

The joystick part 171 includes a plane select switch 1712, a feed speed select switch 1713, and a joystick switch 1711. The joystick part generates feed signals by which a tool is moved in a selected axis on a selected plane (parallel plane to one of the XY,YZ,ZX plane). These feed signals are sent to the main control unit 15.

The MPG part 173 includes a MPG 1731, a step feed value selection switch 1732 and an axis select switch 1733. It generates feed signals which are used for a precision step positioning of the unit of 1, 10 or 100 steps per one pulse. If the MPG is rotated continuously, feed signals are output continuously to the main control unit 15, and the tool or the table is moved continuously in a direction parallel to the axis.

The lever switch part 175 provides a spindle rotation switch 1751, a select switch 1753a, a second select switch 1753b, and a jog feed selection switch 1755.

The spindle rotation switch 1751 is used to select the direction of the spindle rotation, and the second select switch 1753b is used to select the direction of table movement. The jog-feed selection switch 1755 is used to select rapid feed or cutting feed. The lever switch part 175 further includes a spindle rotation override switch 1757a and a feed rate override switch 1757b. When the operator operates these switches, signals from these control devices are sent to the main control unit 15.

The teaching data production unit 23 is used in the teaching mode, and includes a first interruption process part 231, a second interruption process part 233, and a command data production part 235.

Signals from the joystick part 171 are sent to the first interruption process part 231, and the signals from the MPG part 173 and the lever switch part 175 are sent to the second interruption process part 233. The NC command data produced in the command data production part 235 is sent to the teaching program memory 25.

The operation and the teaching procedure of the present invention will be explained with referring to FIG. 3, which shows the operation mode of the machine tool using the NC apparatus of the present invention. The NC apparatus of the present invention has two modes, one is the NORMAL mode and the other is the TEACHING mode. The operator can select the NORMAL mode or the TEACHING mode at the step ST1 using the data setting display unit 70.

In the NORMAL mode the teaching function is not used and the NC apparatus is used as a normal NC apparatus. As in a normal type of apparatus, three types of operation mode can be selected in the NORMAL mode. They are the AUTO MODE (step ST3), the Manual Data Input (MDI) MODE (step ST5), and the MANUAL MODE (step ST7). One of these modes is selected and the machine tool is then operated.

In the AUTO MODE, the machining program is assigned using the data setting display unit 70 at the step ST31. The machining program is either stored in the input program memory 9 or recorded on the paper tape of the machining program recording unit 80 through the input output control unit 11. The machining program is sent to the calculation process unit 13 and the resulting NC command data is output to the main control unit 15. The control command data is produced in the main control unit 15 and output to the driving unit 19. The control command data drives the machine tool 21. The workpiece is then machined (ST 311).

In the MDI MODE, the machining program produced by the operator using the data setting display unit 70 is input to the calculation process unit 13 through the input output control unit 11 (step ST51), and then the same process as in the AUTO MODE is followed (step ST511) using the operator-produced machining program.

In the MANUAL MODE, the operator watches the machining status, and operates switches in the manual operation unit 17. The data from each part of the manual operation unit 17 (the joystick part 171, the MPG part 173 and the lever switch part) is input to the main control unit 15 and the machining process is performed (step ST7).

Figure 3:
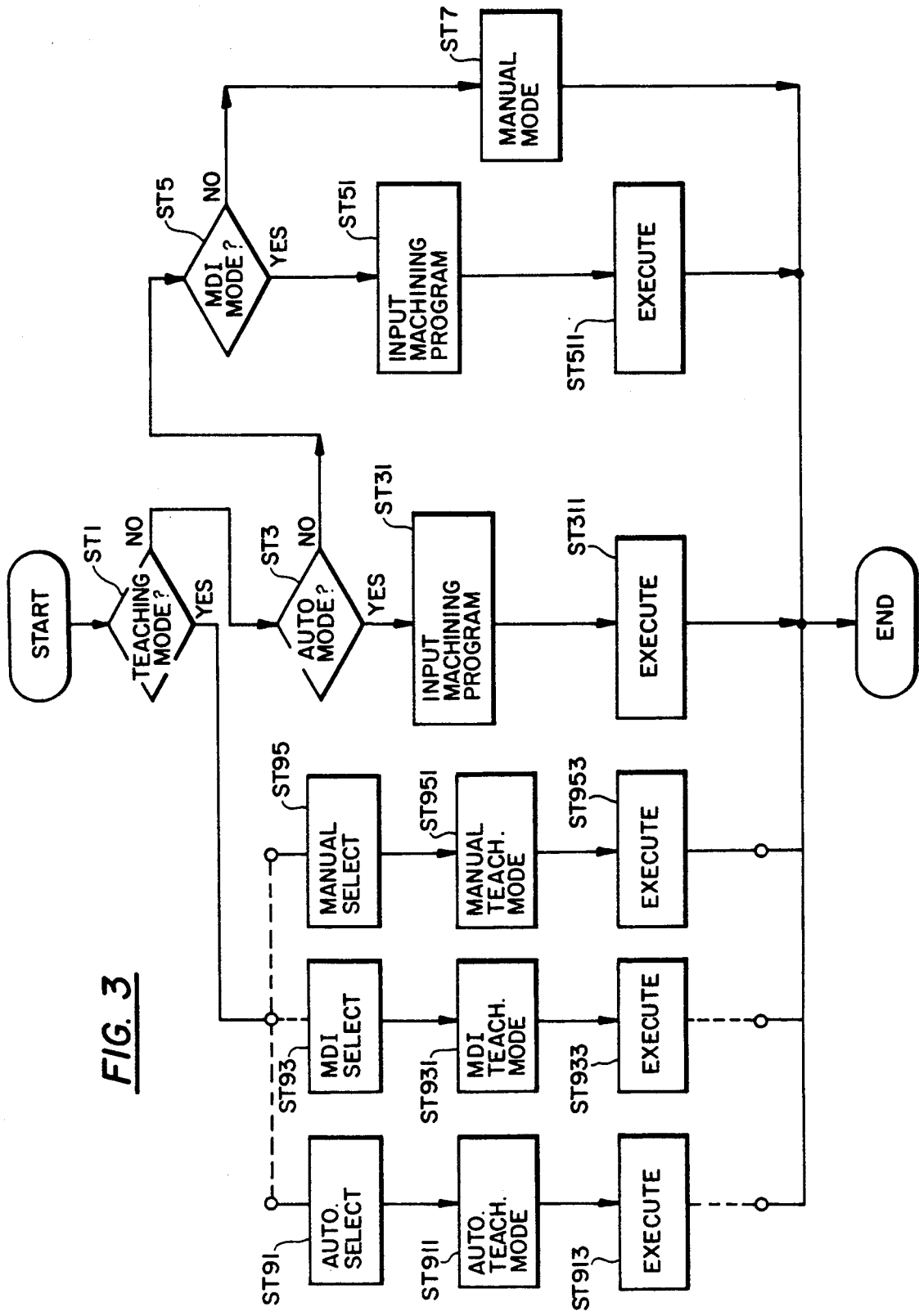
FIG. 3 is a flow chart illustrating the working mode selection for the NC apparatus shown in FIG. 1.

If the TEACHING mode is selected at the step ST1 in FIG. 3, the operator selects one of three modes (sub-modes) at the mode select step ST91,ST93, and ST95 using the data setting display unit 70: these modes are the AUTO TEACHING MODE (step ST911), the MDI TEACHING MODE (step ST931), and the MANUAL TEACHING MODE (step ST951). After selecting one of these modes, the machining process proceeds in the teaching mode thereof (step ST913, step ST933, step ST953).

In the TEACHING MODE, the operator can switch from one to another such as, for example, from the AUTO TEACHING Mode to the MDI TEACHING MODE, or from the MANUAL TEACHING MODE to the MDI TEACHING MODE.

In the AUTO TEACHING MODE, the machining program stored in the input program memory 9 or recorded in the paper tape of the paper tape reader is assigned using the data setting display unit 70, and input to the calculation process unit 13. The machining program command code produced in the calculation process unit 13 is input to main control unit 15, and at the same time, sent to and stored in the final program memory 27.

Accordingly blocks of the machining program which were executed are stored in proper sequential order in the final program memory 27. The process after the main control unit 15 is the same as the AUTO MODE of the NORMAL mode.

In the MDI TEACHING MODE, the operator produces a machining program using the data setting display unit 70. The machining program is then input to the calculation process unit 13 through the input output control unit 11. As in the AUTO TEACHING MODE, the NC command data produced in the calculation process unit 13 is input to the main control unit 15 and at the same time stored in the final program memory 27.

As shown in FIG. 2, when the operator uses the joystick switch 1711 in the MANUAL TEACHING MODE, interrupt instructions per unit interval are generated in the first interruption part 231, coordinate values of the tool or the table and the status of the machine are stored in the command data production part 235, and translated to a machining program code.

When the MPG part 173 or the lever switch part 175 is operated, interruptions are generated in the second interruption part 233 as the status of the machine tool is changed. At this time, the rectangular coordinate data or the status of the machine tool is stored and the data is sent to the command data production part 235, where it is translated into a machining program. The machining program is stored in the teaching program memory 25 after translation.

Thus the MANUAL TEACHING MODE includes three modes: the JOYSTICK TEACHING MODE, the MPG TEACHING MODE, and the LEVER SWITCH TEACHING MODE.

An example of the machining program and the output condition in the JOYSTICK TEACHING MODE which is output from the command data production part 235 is shown in FIG. 4A.

At the beginning of this mode, a special command code is output which shows a time sharing control and the starting address. Similarly, at the ending of this mode, a special command code is output which shows the end of this mode.

During operation, the data of coordinates changing per constant period (e.g., sampling time) is output from the command data production part 235. The spindle rotation, spindle stop, and spindle rotation override, and command of auxiliary function (M) code, however, have no output from the command data production part 235, and thus are not stored in the teaching program memory 25. This is shown in FIG. 4A by the "(not used)" designation in the OUTPUT DATA column.

FIG. 4B is an example of the NC command data from the command data production part 235. In FIG. 4B, the code G01 indicates the linear inter-polation mode of the NC machining program code. The designations X and Y show the code of rectangular coordinates, and the corresponding numerals represent coordinate values. The code G00 indicates the positioning mode of the NC machining program code. The lower downward pointing arrow indicates the end of block code. In general, the "G" represents a preparation function in an NC program.

An example of the machining program and output condition in the MPG TEACHING MODE output from the command production part 235 is shown in FIGS. 5A and 5B.

At the beginning of this mode, there is no output from the command data production part 235. However, during operation, several codes designating parameters are output after the particular machine condition has changed. For example, as shown in FIG. 5B in the first line of code, a linear interpolation command (code G01) and a feed rate command (code F120) are output; alternatively, positioning command (code G00) may be output.

At the ending of this mode or at the changing from this mode to another mode, normally no command is output.

When the moving direction, the selected axis or the multiply rate (1,10,100) is changed during running of the mode, the coordinate value is output from the command data production part 235. For the spindle rotation or the spindle stop, the auxiliary function (M code) and the spindle speed code (S code) are output after the coordinates value is output. For the override, only spindle speed override is available.

For other operations, such as tool unclamp, tool orientation, table indexing, and mist coolant, the auxiliary function command (M code) is output after the coordinate value is output.

FIG. 5B shows the NC command data from the command data production part 235. In FIG. 5B, F indicates the feed rate code in the NC machining program code, whereby S indicates the spindle rotation speed code. The numeral after the code indicates a rotation value in the code. For example F120 shows that the feed rate of the x axis is 120 mm per minute. M04 shows the spindle reverse rotation code. Also S300 shows that spindle reverse rotation speed is 300 r.p.m. which relates with the M04 code.

An example of the machining program and the output condition in the LEVER SWITCH TEACHING MODE output from the command data production part 235 is shown in FIGS. 6A and 6B.

At the beginning of this mode, normally no command is output. A positioning command or a linear interpolation command will be output from the command data production part 235 after, and according to the desired operation. For example, as shown in FIGS. 6A and 6B, a linear interpolation command (code G01) is output if feed is selected, or the positioning command (code G00) is output if rapid is selected. In this case, selection of feed or rapid is done by the jog-feed selection switch 1755, and the F code is calculated by the feed rate override switch 1757b and the position of the jog-feed selection switch 1755.

At the ending of this mode, normally no command is output.

During operation (running) in this mode, the coordinate value is output at the lowering of the lever switch 1755.

As shown in FIG. 6A, when the spindle is rotated the coordinate value is output, and then the code of the auxiliary function command for the machine tool (M code for spindle rotation) and the code of spindle rotation speed (S code) are output. If an override is detected, the coordinate code is output, and then the feed rate code (F) and the spindle rotation speed code (S) are output.

After the coordinate value is output, an auxiliary function code (M) is output for operations, such as tool unclamp, tool orientation, table index and mist coolant. In FIG. 6B, codes M52, M19 and M72 correspond to these functions, respectively.

A mode change operation from one mode to another mode is also available in the TEACHING mode, as explained below.

Figures 7A, 7B:
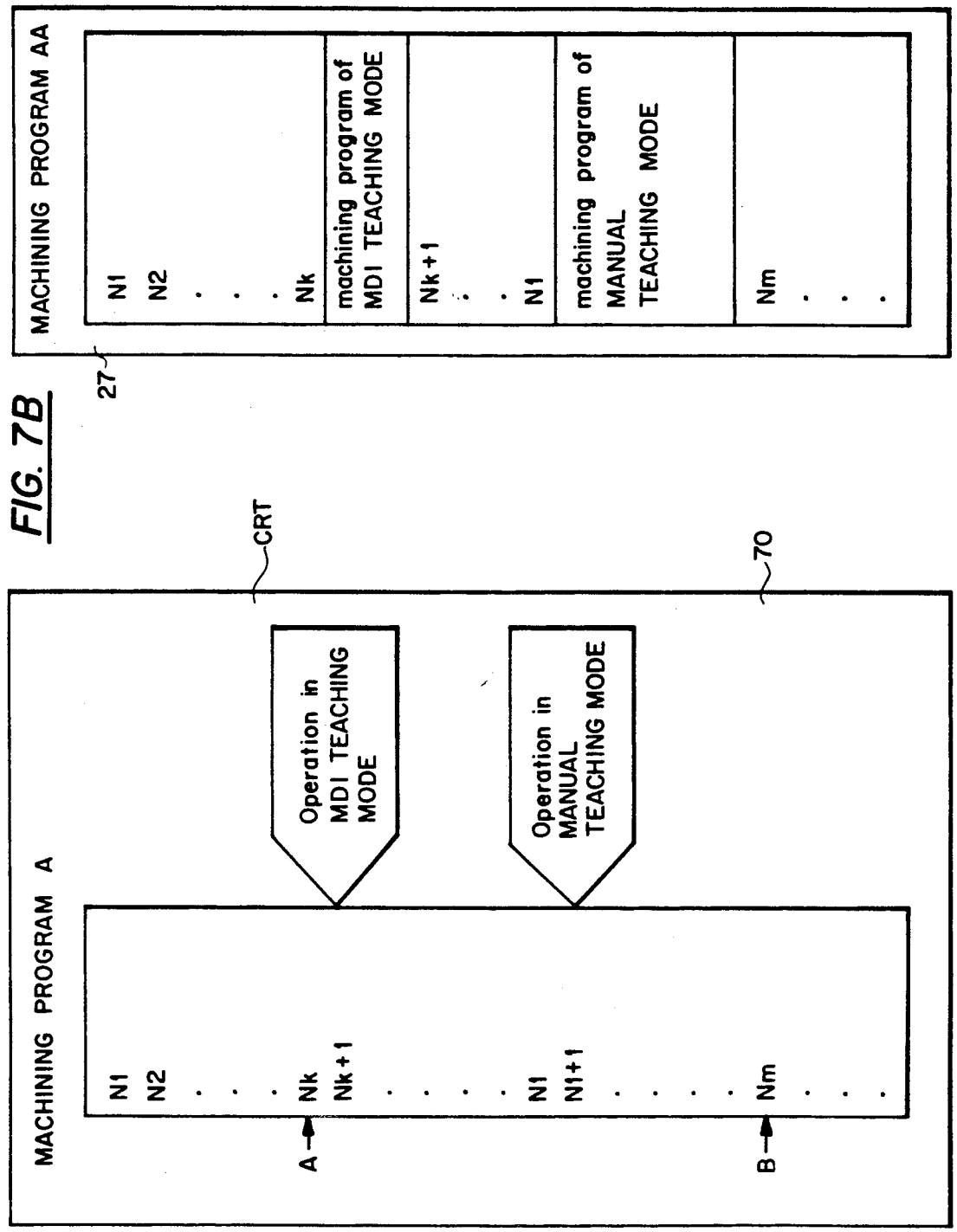
FIGS. 7A and 7B illustrate the machining program stored in the final program memory during operation in the automatic teaching mode, the MDI mode, and the manual teaching mode.

An example of a resulting machining program in the AUTO TEACHING MODE is illustrated in FIGS. 7A and 7B. FIG. 7A shows the CRT of the setting display unit 70, and FIG. 7B shows the final program memory 27. The resulting machining program in the AUTO TEACHING MODE is stored in the final program memory 27. Some mode change operations are held in the AUTO TEACHING MODE.

As shown in FIG. 7A, the machining program to be executed, termed machining PROGRAM A, is input from the input program memory 9 and displayed on the setting display unit 70. A block of the machining program which is executed is indicated with a cursor A: the cursor A indicates the start point for the mode change operation. The operator may change the mode from the AUTO TEACHING MODE to the MANUAL TEACHING MODE or to the MDI TEACHING MODE at any one of the blocks of the machining program.

After the mode is changed, the machining process is performed using the mode which has been selected, in this case the MDI teaching mode at cursor A.

When the machining process is finished, the status is detected in the main control unit 15. The mode is then returned to the AUTO TEACHING MODE automatically, and the next block is started from the block which was being executed before the interruption.

At this point, the operator is able to select another mode, in this case the MANUAL TEACHING MODE using cursor B to indicate the start of another block of the machining program A. As shown in FIGS. 7A and 7B, operation in MANUAL TEACHING MODE begins at block N1+1. Further, the execution of the machining program A in AUTO TEACHING MODE is designated by cursor B to return automatically at block Nm. Therefore, the operations in the MANUAL MACHINING MODE replace the blocks up to cursor B, namely from block N1+1 up to block Nm.

After these operations are completed, the machining program A is updated, and the updated machining program is stored in the final program memory 27. An illustration of such an updated machining program is shown in FIG. 7B as machining PROGRAM AA. New blocks of the machining program are stored between block Nk and block Nk+1 in the program AA for the MDI TEACHING MODE, and between blocks Nl and Nm for the MANUAL TEACHING MODE.

Figure 8:
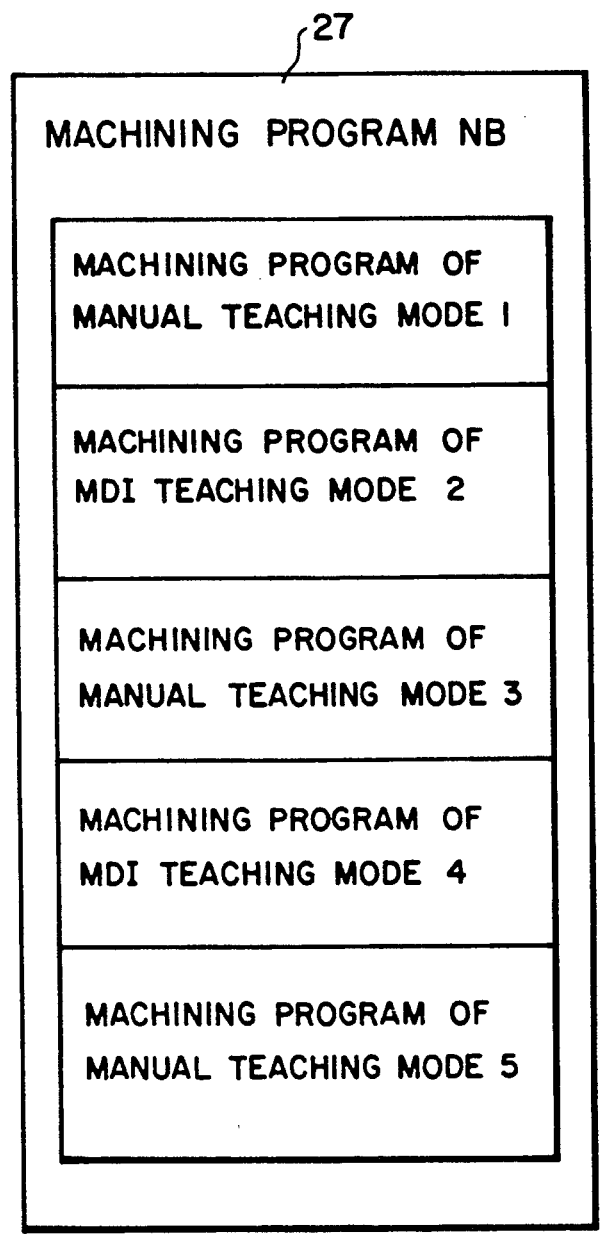
FIG. 8 is an example of a machining program stored in the final program memory during a mixed operation in the manual mode and MDI teaching mode.

Another example of a machining program is shown in FIG. 8, which shows the contents of the final program memory 27. This program is an example in which the MANUAL TEACHING MODE or the MDI TEACHING MODE is selected first, and the mode is then changed. In this case a machining program is selected on the setting display unit 70, and the machining process is started with the selected mode. At any point in the machining the mode may be changed from the MANUAL TEACHING MODE to the MDI TEACHING MODE, or from the MDI TEACHING MODE to the MANUAL TEACHING MODE. In such a machining process, the selected machining program is edited and stored in teaching program memory 25 at the end of the machining process, and sent to the final program memory 27 and stored therein. As shown in FIG. 8, the machine operates first in the MANUAL TEACHING MODE; the mode is changed to the MDI TEACHING MODE, and then returned to the MANUAL TEACHING MODE. The machining program produced in the MDI TEACHING MODE is combined with the data produced in the MANUAL TEACHING MODE and then stored in final program memory 27. As shown in FIG. 8, these modes are freely changeable with each another.

As described above, according to the present invention, if it is required to modify the machining program in the normal mode, the operator can select and operate in one of the teaching modes to modify the machining program, such as in the AUTO TEACHING MODE, in the MDI TEACHING MODE and in the MANUAL TEACHING MODE. Thus, machining programs may be changed at the machining spot.

Accordingly operations used in the machining process of this modified operation may be reproduced, because the modified machining program is stored in the final program memory.

Furthermore when the machining process is operated in the AUTO TEACHING MODE, the operator can interrupt the machining process in the MANUAL TEACHING MODE or in the MDI TEACHING MODE. After the teaching operation, the entire modified program can be reproduced.

As a result, the machine process is operated under improved conditions, because the operator can add his know-how to the specially-prepared machining program. Accordingly, products made by the machine tool using the NC apparatus of the present invention are greatly improved.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A numerical control apparatus having a teaching mode for generating a machining program and controlling a machine tool based on coordinate values in a reference space, the apparatus comprising:
   input-output means for inputting a machining program, the machining program providing instructions as to positioning of the machine tool within the reference space and a machining operation of the machine tool;
   manual operation means for generating manual data based on manual operation of manual controls for the machine tool, the manual controls controlling position of the machine tool within the reference space and the machining operation of the machine tool;
   main control means for controlling the position and machining operation of the machine tool based on coordinate values in a reference space and one of the input machining program and the manual data;
   teaching data production means for generating a teaching machining program based on the manual data generated by manual operation of the manual controls and the machining controls; and
   first memory means for integrating the teaching machining program and the input machining program together to form a resulting machining program.

2. The numerical control apparatus of claim 1, wherein the input-output means includes a machining program recording unit, a data setting and display unit and a input-output control unit.

3. The numerical control apparatus of claim 2, wherein the data setting and display unit includes a remote data setting and display unit and a remote machining program recording unit.

4. The numerical control apparatus of claim 2, wherein the data setting and display unit includes:
   first selection means for selecting one of a normal mode and the teaching mode; and
   second selection means for selecting one of the three sub-modes of the teaching mode.

5. The numerical control apparatus of claim 2, further comprising:
   second memory means for storing a machine program;
   first selection means for selecting between one of a normal mode and a teaching mode;
   second selection means for selecting one of an automatic teaching mode, a manual data input teaching mode, and a manual teaching mode in the teaching mode; and wherein
   the data setting and display unit inputs a manually entered machining program in the manual data input teaching mode;
   the input-output means inputs the stored machining program in the automatic teaching mode and inputs the manually entered program from the data setting and display unit in the manual data input teaching mode;
   the main control means control the machine tool based on the stored machining program when in the automatic teaching mode, the manually entered machining program when in the manual data input teaching mode, and the manual data when in the manual teaching mode;
   the first memory means stores executed portions of the stored machining program in the automatic teaching mode, stores executed portions of the manually entered machining program in the manual data input teaching mode, and stores portions of the teaching machining program corresponding to executed portions of the manual data in the manual teaching mode to form the resulting machining program.

6. The numerical control apparatus of claim 1, wherein
   the manual controls include a joystick, a manual data input part, and a lever switch part; and
   the teaching data production means includes:
   a first interruption process part for inputting data from the joystick;
   a second interruption process part for inputting data for at least one of the manual data input part and the lever switch part; and command data production part for generating the teaching machining program based on the input data.

7. The numerical control apparatus of claim 1, wherein the manual operation means comprises:
a joystick part including a joystick switch;
a manual pulse generator part having a manual pulse generator; and
a lever switch part including a lever switch for spindle control and a lever switch for jog-feed control.

8. The numerical control apparatus of claim 1, wherein the input-output means displays the input machining program.

9. The numerical control apparatus of claim 1, further comprising a calculation processing means for generating code data based on the input machining program, and wherein the main control means controls the machine tool based on one of the code data and the manual data.

10. The numerical control apparatus of claim 5, wherein the first selection means selects between a normal mode and the teaching mode anytime during the positioning of the machine tool and the machining operation of the machine tool; and the second selection means selects between the automatic teaching mode, manual data input teaching mode and manual teaching mode anytime during the positioning of the machine tool and the machining operation of the machine tool when in the teaching mode.

11. A method for generating a machining program for a numerical control apparatus and operating the numerical control apparatus, the numerical control apparatus having a plurality of operating modes to control a machine tool, the method comprising the steps of:
selecting in a teaching mode between at least a first sub-teaching mode and a manual teaching mode;
inputting a machining program in the first sub-teaching mode, the machining program providing instructions as to positioning of the machine tool within the reference space and a machining operation of the machine tool;
manually controlling, via manual controls, the position and machining operation of the machine tool in the manual teaching mode;
controlling the machine tool according to the selected one of the input machining program in the first sub-teaching mode and the manual control of the machine tool in the manual teaching mode;
generating a teaching machining program from the manual control of the position and machining operation of the machine tool in the manual teaching mode;
combining the input machining program and the teaching machining program to form a resulting machining program in the teaching mode; and
storing the resulting machining program.

12. The method of claim 11, wherein the first teaching sub-mode includes an automatic teaching mode and a manual input data teaching mode, the input machining program is a stored machining program in the automatic teaching mode, and the input machining program is a manually entered machining program in the manual data input teaching mode.

13. The method of claim 11, further comprising the steps of:
selecting between a normal mode and the teaching mode;
selecting in the normal mode between an automatic mode, a manual data input mode, and a manual mode; and
controlling the machine tool according to a stored machining program in the automatic mode, a manually entered machining program in the manual data input mode, and manual control in the manual mode.

14. The method of claim 13, wherein the step of selecting between a normal mode and the teaching mode can be performed at anytime during the positioning of the machine tool and the machining operation of the machine tool; and the selecting in the normal mode step can be performed at anytime during the positioning of the machine tool and the machining operation of the machine tool when in the normal mode.

15. The method of claim 11, wherein the controlling step, when in the manual teaching mode, includes the step of controlling the machine tool using a joystick switch.

16. The method of claim 11, wherein the controlling step, when in the manual teaching mode, includes the step of controlling the machine tool using a manual pulse generator.

17. The method of claim 11, wherein the controlling step, when in the manual teaching mode, includes the step of controlling the machine tool using lever switches.

* * * * *